(12) United States Patent
Oliver et al.

(10) Patent No.: US 8,707,862 B1
(45) Date of Patent: Apr. 29, 2014

(54) COOKING APPARATUS AND METHOD

(75) Inventors: William H. Oliver, Denver, CO (US); Randall W. Nichols, Denver, CO (US)

(73) Assignee: Chipotle Mexican Grill, Inc., Denver, CO (US)

( * ) Notice: Subject to any disclaimer, the term of this patent is extended or adjusted under 35 U.S.C. 154(b) by 333 days.

(21) Appl. No.: 12/986,942

(22) Filed: Jan. 7, 2011

(51) Int. Cl.
*A47J 27/00* (2006.01)

(52) U.S. Cl.
USPC ............... 99/490; 99/326; 99/328; 99/329 R; 99/342; 99/343; 99/348; 99/407; 99/409; 99/427

(58) Field of Classification Search
USPC ....... 99/326, 328, 329 R, 342, 343, 348, 407, 99/409, 427
See application file for complete search history.

(56) References Cited

U.S. PATENT DOCUMENTS

| | | | | |
|---|---|---|---|---|
| 1,880,822 A | * | 10/1932 | Cook et al. | 219/389 |
| 2,700,723 A | * | 1/1955 | Lynch, Jr. | 219/433 |
| 2,785,623 A | * | 3/1957 | Graham | 99/357 |
| 3,095,326 A | * | 6/1963 | Green et al. | 118/704 |
| 3,115,821 A | * | 12/1963 | Hubner | 241/101.5 |
| 3,253,533 A | * | 5/1966 | Benson | 99/323.4 |
| 3,364,845 A | * | 1/1968 | Wilson et al. | 99/336 |
| RE26,672 E | * | 9/1969 | Wilson et al. | 99/336 |
| 3,501,316 A | * | 3/1970 | Guthrie, Sr. | 426/296 |
| 3,502,848 A | * | 3/1970 | Fink | 219/432 |
| 3,958,035 A | * | 5/1976 | Stearns et al. | 426/614 |
| 4,048,473 A | * | 9/1977 | Burkhart | 219/389 |
| 4,173,925 A | * | 11/1979 | Leon | 99/348 |
| 4,450,758 A | * | 5/1984 | Belinkoff et al. | 99/332 |
| 4,457,217 A | * | 7/1984 | Ogawa et al. | 99/295 |
| 4,706,558 A | * | 11/1987 | Snyder, Jr. | 99/455 |
| 4,745,293 A | * | 5/1988 | Christensen | 250/577 |
| 4,802,407 A | * | 2/1989 | Negri et al. | 99/453 |
| 4,878,627 A | * | 11/1989 | Otto | 241/199.12 |
| 4,901,633 A | * | 2/1990 | De Longhi | 99/409 |
| 4,907,502 A | * | 3/1990 | Snyder, Jr. | 99/455 |
| 5,167,216 A | * | 12/1992 | Yeung et al. | 126/349 |
| 5,176,069 A | * | 1/1993 | Chen | 99/348 |
| 5,182,981 A | * | 2/1993 | Wilcox | 99/333 |
| 5,233,916 A | * | 8/1993 | Butler et al. | 99/325 |

(Continued)

FOREIGN PATENT DOCUMENTS

WO 2005041678 A1 5/2005

OTHER PUBLICATIONS

Revolation Delta, available at http://www.chocovision.com/choco/site/comingsoon.htm, printed on Jul. 12, 2010, 1 page.

(Continued)

*Primary Examiner* — Henry Yuen
*Assistant Examiner* — Jimmy Chou
(74) *Attorney, Agent, or Firm* — Sheridan Ross P.C.

(57) ABSTRACT

Methods and apparatuses for cooking food are provided. In particular, food is placed in a bowl held at an angle to horizontal. With the food in the bowl, the bowl is simultaneously heated and rotated. A scraper assembly is disposed within the bowl, to lift the food from the side and bottom surfaces of the bowl as the bowl rotates. A temperature sensor can be provided to provide a signal to discontinue rotation of the bowl and the application of heat to the bowl when the food has reached a desired temperature. A tilt mechanism can also be provided to maintain the food within a desired distance from the top edge of the bowl.

10 Claims, 5 Drawing Sheets

(56) References Cited

U.S. PATENT DOCUMENTS

| | | | |
|---|---|---|---|
| 5,275,092 A * | 1/1994 | Fauteux | 99/407 |
| 5,386,102 A * | 1/1995 | Takikawa et al. | 219/620 |
| 5,512,733 A * | 4/1996 | Takikawa et al. | 219/620 |
| 5,711,602 A * | 1/1998 | Rohring et al. | 366/251 |
| 5,938,325 A * | 8/1999 | Edwards | 366/129 |
| 5,941,164 A * | 8/1999 | Stein et al. | 99/323.9 |
| 6,196,114 B1 * | 3/2001 | Rohloff | 99/337 |
| 6,624,396 B2 * | 9/2003 | Witt et al. | 219/497 |
| 6,629,491 B1 * | 10/2003 | Chan | 99/331 |
| 6,872,917 B2 * | 3/2005 | So | 219/389 |
| 6,883,420 B2 * | 4/2005 | Kuttalek | 99/334 |
| 6,927,366 B2 * | 8/2005 | Sawhney et al. | 219/438 |
| 7,000,530 B2 * | 2/2006 | Damrath et al. | 99/427 |
| 7,011,013 B2 * | 3/2006 | Leason | 99/339 |
| 7,161,165 B2 * | 1/2007 | Wirthlin | 250/577 |
| 7,231,872 B2 * | 6/2007 | Babicz | 99/455 |
| 7,485,830 B2 * | 2/2009 | Wang | 219/429 |
| 8,066,427 B2 * | 11/2011 | Wong | 366/276 |
| 8,122,815 B2 * | 2/2012 | Wolfe | 99/348 |
| 2002/0041920 A1 | 4/2002 | Fernandez | |
| 2004/0159244 A1 * | 8/2004 | Leason | 99/348 |
| 2004/0231524 A1 * | 11/2004 | Kuttalek | 99/357 |
| 2005/0136172 A1 | 6/2005 | Hairsine et al. | |
| 2006/0278095 A1 * | 12/2006 | Saunders et al. | 99/348 |
| 2007/0208483 A1 * | 9/2007 | Rabin | 701/72 |
| 2008/0008806 A1 * | 1/2008 | Boussemart et al. | 426/519 |
| 2008/0110348 A1 * | 5/2008 | Wallis | 99/352 |
| 2010/0326284 A1 * | 12/2010 | Volz et al. | 99/323.1 |
| 2011/0116340 A1 * | 5/2011 | Gerl et al. | 366/145 |
| 2011/0117259 A1 * | 5/2011 | Storek et al. | 426/509 |
| 2011/0293797 A1 * | 12/2011 | Pryor et al. | 426/231 |

OTHER PUBLICATIONS

Revolation X 3210, available at http://www.chocovision.com/choco/site/x23_spec.htm, printed on Jul. 12, 2010, 2 pages.

Revolation Delta Chocolate Tempering System Owner's Manual, ChocoVision Corp., printed on Jul. 12, 2010, 13 pages.

* cited by examiner

COOKING APPARATUS AND METHOD

FIELD

The present invention is directed to methods and systems for cooking food, including eggs, sauces containing eggs, and sauces containing dairy products.

BACKGROUND

Cooked eggs and sauces containing eggs or other dairy products are often part of the fare made available to consumers by commercial kitchens at restaurants or events at which food is served. However, eggs and egg or other dairy containing sauces can be difficult to cook, and after cooking, are difficult to maintain in an appetizing state. In order to include eggs and dairy containing sauces on menus, eggs and sauces can be pre-cooked. However, this can result in wastage and unsatisfactory taste and consistency. Although automated systems have been developed for producing fried eggs in high volumes, those devices are not without drawbacks, and are incapable of producing other styles of eggs. Accordingly, offering freshly cooked eggs and sauces has been difficult and labor intensive.

In addition, certain techniques for cooking eggs require more skill and labor than others. For example, European style cream eggs, in which the whites of blended eggs are cooked until they are solid, but the yokes remain fluid, are considered by many to be a delicacy, but require skill to prepare. As a further example, egg-based sauces, such as hollandaise sauce or pastry cream, require constant stirring and careful control of applied heat. Therefore, certain styles of eggs and types of sauces require skilled personnel. This has limited the ability of restaurants and food service operations to offer fresh, properly prepared eggs and sauces.

SUMMARY

The present invention is directed to solving these and other problems and disadvantages of the prior art. In accordance with embodiments of the present invention, a cooking apparatus is provided in which food, including eggs, egg-based sauces, and/or dairy containing sauces, can be cooked in a controlled manner. In particular, a tilted rotating bowl and scraper are provided to circulate the food. In addition, heating elements are provided to bring the food to a specified temperature. Monitoring of the temperature can be by a temperature sensor, interconnected to a device controller.

In a cooking apparatus in accordance with embodiments of the present invention, a bowl for receiving food to be cooked is held at an angle to horizontal. In addition, the bowl is interconnected to a motor that operates to rotate the bowl. A scraper assembly contacts at least a portion of the interior of the bowl, and acts to fold and/or stir food placed in the bowl while the bowl is rotated relative to the scraper. Heating elements are disposed about the exterior of the bowl, and apply heat to the side of the bowl. The temperature of the food can be monitored by a food temperature sensor that provides a signal that can be used to discontinue the rotation of the bowl and/or the application of heat when a desired temperature has been reached. Alternatively or in addition, temperature sensors may be provided to read the temperature at one or more locations on the bowl. In accordance with further embodiments, the heating elements can be controlled to provide a desired level of heating. In accordance with still other embodiments, a tilt mechanism is provided so that the angle at which the bowl is tilted can be varied, to accommodate different amounts of food. The tilt mechanism can also facilitate removing food from the bowl after it has been cooked.

A culinary method in accordance with embodiments of the present invention includes providing a bowl that is supported at an angle to horizontal. The method further includes surrounding the bowl with a plurality of heating elements. A scraper blade is positioned in the bowl, with the blade edge in contact with at least a portion of the side surface and bottom surface of the bowl. Food is placed in the bowl, and the bowl is rotated relative to the scraper blade, while heat is applied through the heating elements. The temperature sensor is positioned to read the temperature of the food, directly or indirectly, and can provide a signal that is used to modify and/or discontinue the application of heat and rotation of the bowl when a desired temperature is reached. In accordance with further embodiments of the present invention, the method includes tilting the bowl, so that the food extends up the side surface of the bowl to within a desired distance from the bowl's top edge.

DETAILED DESCRIPTION

Figure 1:
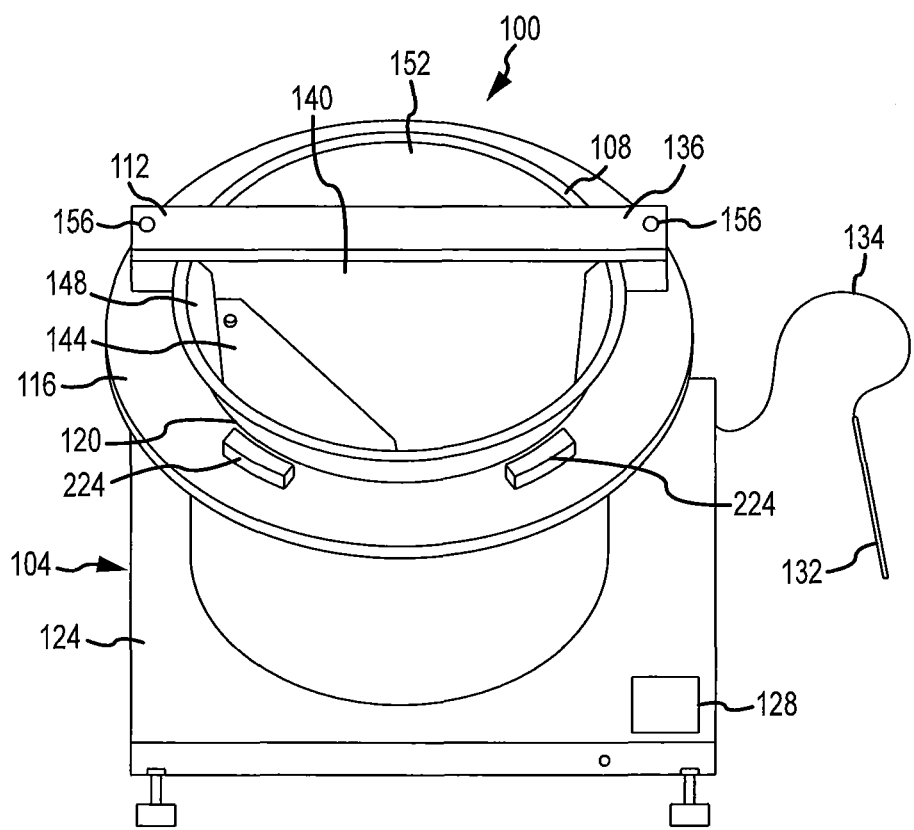
FIG. 1 is a front elevation view of a cooking apparatus in accordance with embodiments of the present invention.

FIG. 1 is a front elevation view of a cooking apparatus 100 in accordance with embodiments of the present invention. In general, the cooking apparatus includes a base assembly 104, a bowl 108, and a scraper assembly 112. The base assembly 104 includes a top surface 116 and an aperture 120 formed in the top surface 116. Support surfaces 224 can be provided to help support the bowl 108. The base assembly 104 can also include a support structure 124 and a control interface 128. The control interface 128 can include a display to provide output to a user regarding the operation of the cooking apparatus and/or the temperature of food being cooked, and can accept input from a user through, for example and without limitation, a numeric keypad, keyboard, function keys or a touch screen display. The control interface can also include switches, for example to turn the cooking apparatus on and off. A food temperature sensor 132 is also included. The food temperature sensor 132 can be interconnected to a controller 296 (see FIG. 2) by a signal line 134.

The scraper assembly 112 generally includes a bridge 136 interconnected to or integral with a support mounting surface 140 that, when the scraper assembly 112 is attached to the base assembly 104, extends at least partially into the interior of the bowl 108. Attached to the support mounting surface 140 is a blade support 144. Interconnected to or held by the blade support 144 is a blade 148 having an edge that contacts the interior of the bowl 108. The scraper assembly 112 can also include a lid portion 152. The scraper assembly 112 is attached to the base assembly 104 by mechanical fasteners 156 disposed on either end of the bridge 136. In accordance with embodiments of the present invention, the mechanical fasteners 156 can comprise pins or lugs extending from the base assembly 104 that engage holes formed in the bridge 136. The mechanical fasteners 156 allow the scraper assembly 112 to be selectively attached to or disconnected from the base assembly 104.

Figure 2:
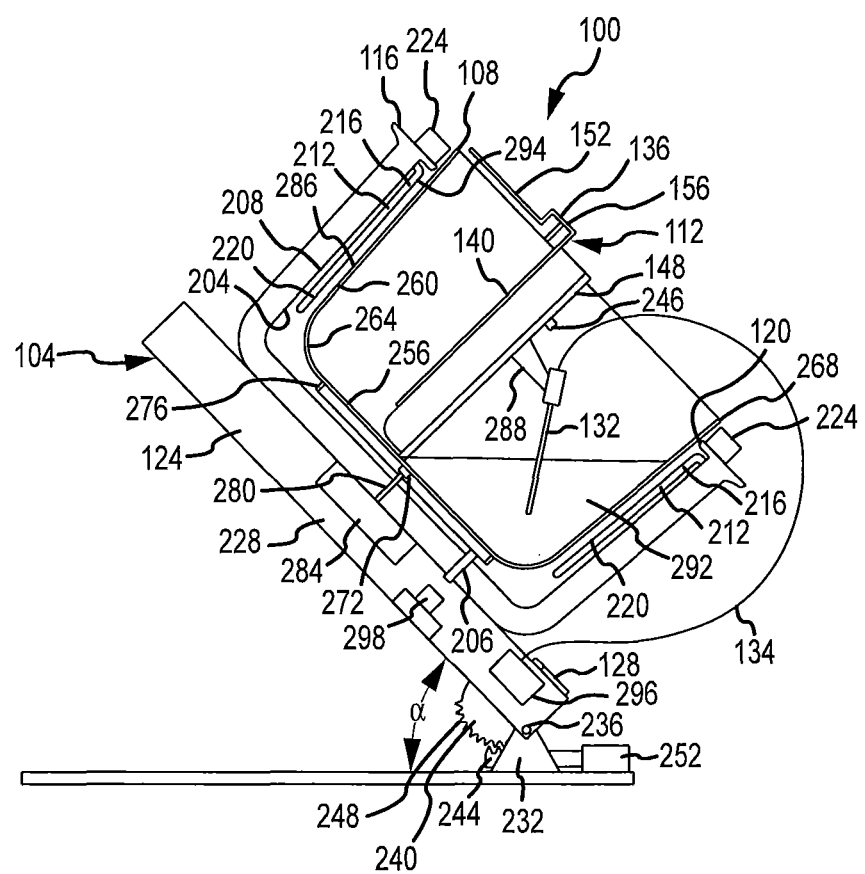
FIG. 2 is a side cross-sectional view of a cooking apparatus in accordance with embodiments of the present invention.

FIG. 2 is a cross-section of a cooking apparatus 100 in accordance with embodiments of the present invention. As shown in the figure, the receiving aperture 120 formed in the top surface 116 of the base assembly 104 allows the bowl 108 to be placed within a receiving chamber 204. The receiving chamber 204 features a circular sidewall 208. In accordance with embodiments of the present invention, the circular sidewall 208 can incorporate thermal insulation. The diameter of the circular sidewall 208 may be greater than the diameter of the receiving aperture 120. Heating elements 212 are disposed at intervals along the circular sidewall 208. This can create an annular space in which the heating elements 212 are disposed. The heating elements 212 can comprise radiant heating elements, with unheated portions 216 and hot portions 220. The base assembly 104 can additionally include a plurality of support surfaces or elements 224. The support surfaces 224 can be arranged in intervals about the receiving aperture 120. In accordance with embodiments of the present invention, the support surfaces 224 can comprise Teflon™ bearing blocks.

The support structure 124 can include a support member 228 and a base structure 232. In accordance with embodiments of the present invention, the support member 228 can be interconnected to the base structure 232 by a hinge 236. The angle of the support member 228 relative to the base structure 232, and relative to horizontal, can be selected through operation of a tilt mechanism 240 that is operable to rotate the support member 228 about the hinge 236. In accordance with embodiments of the present invention, the tilt mechanism 240 can include a worm gear 244 interconnected to the base structure 232 that acts on a gear wheel 248 fixed to the support structure 228. The worm gear 244 is interconnected to a drive mechanism 252. The drive mechanism 252 can comprise a hand operated crank, an electric motor, or other mechanism operable to rotate the worm gear 244 to control the angle α relative to horizontal of a bowl 108 placed in the receiving chamber 204. In accordance with embodiments of the present invention, the angle α while the cooking apparatus 100 is in operation may be from 10 degrees to 80 degrees. In accordance with still other embodiments, the angle α while the cooking apparatus 100 is in operation may be from about 45 degrees to about 80 degrees. Moreover, additional angles can be selected, for example an angle α of 0 degrees can be selected when the bowl 108 is being placed in the receiving chamber 204. As another example, an angle α of 90 degrees or greater, for example in a range from 90 degrees to 140 degrees, can be selected, for example for pouring food out of the bowl 108. In accordance with embodiments of the present invention, the tilt mechanism 240 can be located such that the hinge or pivot point 236 is at or near the center of gravity of the pivoted portions of the cooking apparatus 100.

The bowl 108 generally includes a disc shaped bottom surface 256, interconnected to a side surface 260 by a transition surface 264, and a top edge 268. The bowl 108 also includes a drive engagement member 272 centered on an exterior of the bottom surface 256. The bowl 108 can also include a bowl support 276. The bowl support 276 may, for example, comprise a circular band, a plurality of tabs, or a plurality of posts formed on the exterior of the bowl's bottom surface 256 that provides a stable support for the bowl 108 when the bowl 108 is removed from the base assembly 104 and is placed on a level surface, such as a counter or table.

The blade 148 of the scraper assembly 112 generally extends from the blade support 144, and provides a pliable surface that contacts the side surface 260, the transition surface 264 and the bottom surface 256 of the bowl 108. In accordance with embodiments of the present invention, the blade 148 comprises a suitably heat resistant, pliable material, such as nylon, acrylonitrile-butadiene-styrene (ABS), polypropylene, or other polymer or plastic. In accordance with embodiments of the present invention, the blade support 144 can comprise two pieces of sheet metal on either side of the blade 148. Moreover, the blade support 144 can extend to a point proximate to the edge of the blade 148 that contacts the interior surface of the bowl 108, to provide mechanical support, and/or to act as a heat sink.

When the bowl 108 is placed in the receiving chamber 204 of the base assembly 104, the drive engagement member 272 of the bowl 108 can be coupled with an engagement surface of a drive element 280 that extends into the receiving chamber 204, and that is interconnected to or comprises a portion of the drive shaft of a drive motor 284. In addition, the drive element 280 can include a shoulder to support some or all of the weight of the bowl 108 at the drive engagement member 272. Accordingly, in operation, the drive motor 284 can operate to rotate the bowl 108 relative to the base assembly 104 and the scraper assembly 112. In addition, portions of the exterior 286 of the bowl side surface 260 adjacent the support surfaces 224 can rest against one or more of the support surfaces 224, to help maintain centering or approximate centering of the bowl 108 within the receiving aperture 120 and the receiving chamber 204.

The food temperature sensor 132 is held by a temperature sensor mount 288 such that the tip of a food temperature sensor 132 comprising a temperature probe is held within food 292 placed in the bowl 108 for cooking. Alternatively, for example where the food temperature sensor 132 comprises a non-contact infrared food temperature sensor, the food temperature sensor 132 may be positioned such that it has a direct line of sight to the food 292 in the bowl 108. The food temperature sensor 132 can be operatively interconnected to a controller 296 by a signal line 134. Alternatively or in addition, a bowl side temperature sensor 294 and/or a bowl bottom temperature sensor 298 can be included. As an example, the bowl side temperature sensor 294 may comprise a thermocouple or other device that provides a signal indicating a temperature at or near the bowl side surface 260 to the controller 296. A temperature signal from the bottom temperature sensor 298 can also be provided to the controller 296. The bowl bottom temperature sensor 298 can, for example, comprise an infrared temperature sensor that obtains a temperature reading from the bottom 256 of the bowl 108. According to such embodiments, an access tube 206 can provide a line of sight from the bottom temperature sensor 298 to the bottom of the bowl 108. Moreover, the access tube 206 may extend some distance from the bottom of the receiving chamber 204, and may stop short of the bottom temperature sensor 298 so as to provide a gap between the access tube 206 and the bottom temperature sensor 298. By thus configuring the access tube 206, the bottom temperature sensor 298 can remain operational, even if liquid matter is spilled in the receiving chamber 204. In accordance with embodiments of the present invention, use of a side temperature sensor 294 and/or a bottom temperature sensor 298 can allow the food temperature sensor 132 to be omitted. Omitting a food temperature sensor 132 can be advantageous, to avoid problems with food 292 collecting on the food temperature sensor 132, for example where the food temperature sensor 132 is a temperature probe, or problems with condensation interfering with sensing, for example where the food temperature sensor 132 is an infrared device.

A tilt sensor 246 can be provided that senses the distance of the food 292 from the top edge 268 of the bowl 108. For example, a tilt sensor 246 comprising a photo sensor can detect when the food 292 has reached a desired distance from the top edge 268. Accordingly, the tilt of the bowl 108 relative to horizontal can be selected so that the bowl 108 is at an angle that maintains a desired distribution of the food 292 along the side 260 of the bowl 108, even as the volume of the food 292 changes during cooling, and/or to accommodate different batch sizes. The tilt sensor 246 can be mounted to the scraper assembly 112, and can be operatively interconnected to the controller 296 by a signal line. In accordance with further embodiments, the tilt sensor 246 may comprise a float or other mechanical sensor that monitors the location of the food 292 with respect to the top edge 268 of the bowl 108.

The controller 296 can comprise a general purpose programmable processor, microcontroller, field programmable gate array, or other device or combination of devices. In accordance with embodiments of the present invention, the controller 296 is operatively interconnected to the control interface 128 to accept control input from and provide output information to a user. Moreover, the controller 296 can be interconnected to the heating elements 212, the drive motor 284, and/or the tilt mechanism drive 252 to provide operational control of the cooking apparatus 100, as described herein. In addition, the controller 296 can receive information regarding the temperature of the food 292 from the food temperature sensor 132, and information from the tilt sensor 246 regarding the distance of the food 292 from the top edge 268 of the bowl 108. The controller 296 can also incorporate or implement a timer or clock.

Figure 3:
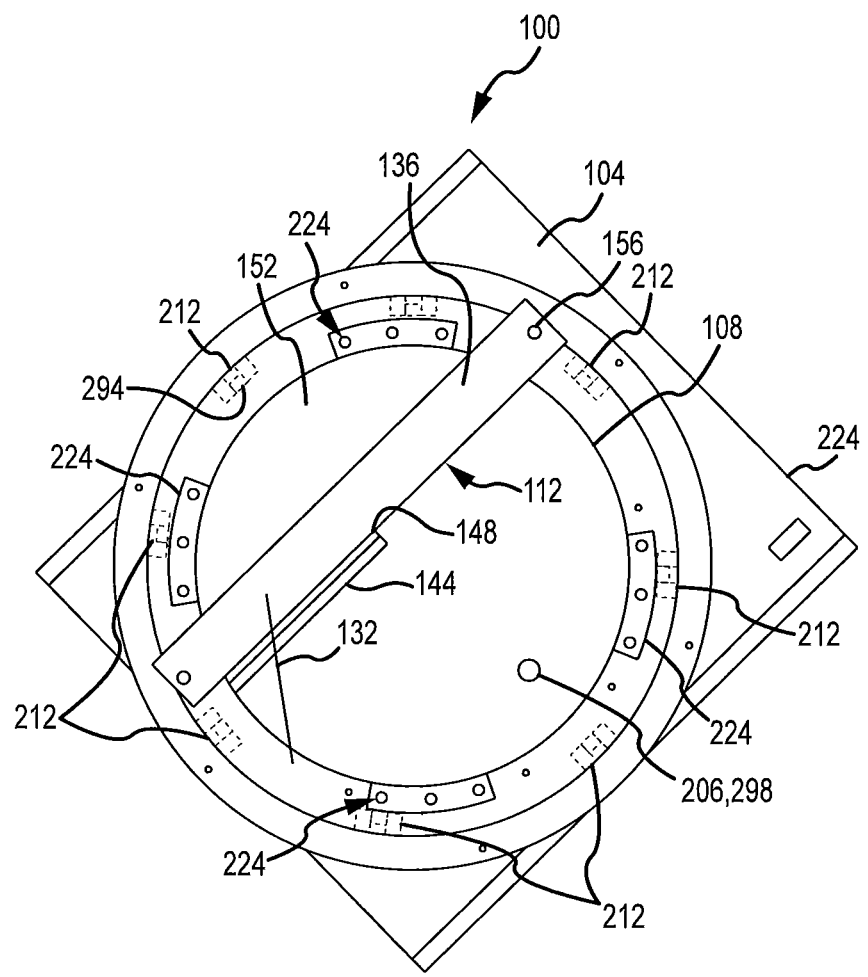
FIG. 3 is a view of a receiving chamber of a cooking apparatus in accordance with embodiments of the present invention.

With reference now to FIG. 3, the receiving chamber 204 of a cooking apparatus 100 in accordance with embodiments of the present invention is shown, from a view looking into the receiving chamber 204. As shown in this view, a plurality of support surfaces 224 are arranged at intervals about the receiving aperture 120 of the base assembly 104. In addition, the scraper assembly 112 is shown, with the blade 148 and blade support 144 extending from the support mounting surface 140. Also shown are the heating elements 212, arranged at intervals around the interior of the receiving aperture 120. Since the heating elements 212 are generally obscured by the top surface 116, which extends towards the bowl 108 to limit heat loss out of the aperture 120, the heating elements 212 are shown using dotted lines. In the present example, eight heating elements 212 are shown disposed at equal intervals about the circumference of the receiving chamber 204. In accordance with other embodiments of the present invention, different numbers of heating elements 212 can be incorporated into the cooking apparatus 100. Moreover, the heating elements 212 can be unequally spaced, for example to concentrate heat under areas of the bowl 108 that contain food 292.

Figure 4:
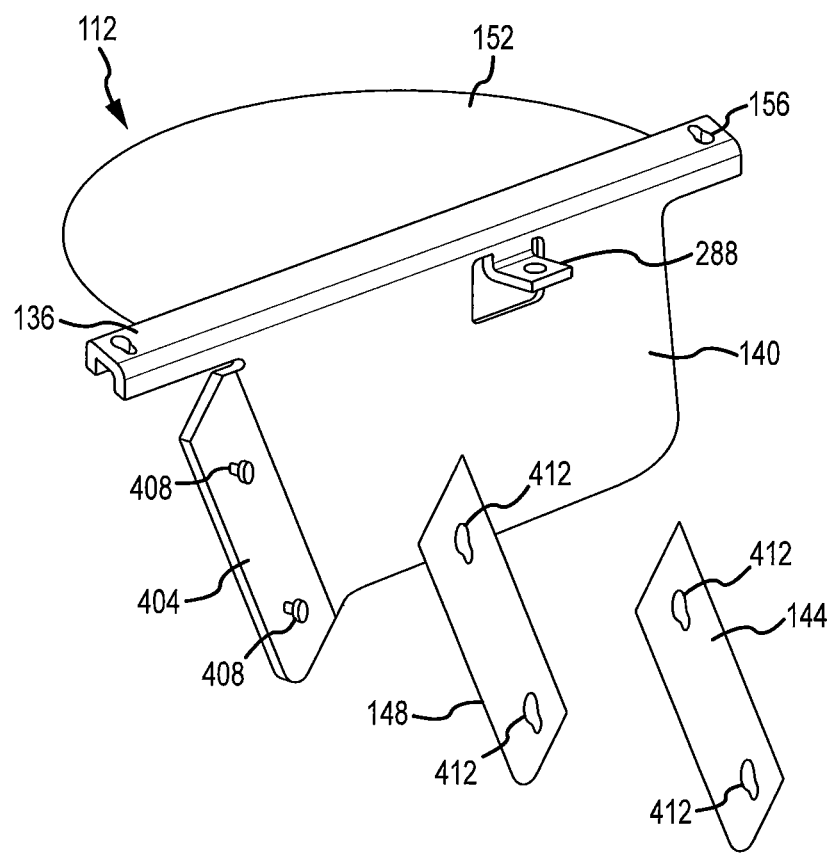
FIG. 4 is an exploded view of a scraper assembly in accordance with embodiments of the present invention.

FIG. 4 is an exploded view of a scraper assembly 112 in accordance with embodiments of the present invention. As shown, the support mounting surface 140 includes an angled portion 404 to which the blade 148 is attached via fasteners 408. In the illustrated embodiment, the fasteners 408 comprise lugs that are received by cooperating apertures 412 in the blade 148 and the blade support 144. In the illustrated embodiment, the support mounting surface 140 has a profile that generally follows the profile of the bowl 108 interior. Such a configuration can assist in retaining heat in the portion of the bowl 108 in which the food 292 is placed. In accordance with embodiments of the present invention, the support mounting surface 140 is configured to provide at least some clearance space between the interior of the bowl 108 and the support mounting surface 140. Therefore, the blade 148 may be the only component of the scraper assembly 112 that is in contact with the bowl 108 interior. The illustrated scraper assembly 112 also includes a temperature sensor mount 288. As can be appreciated by one of skill in the art after consideration of the present disclosure, in embodiments in which a food temperature sensor 132 is omitted, a temperature sensor mount 288 need not be provided.

Figure 5:
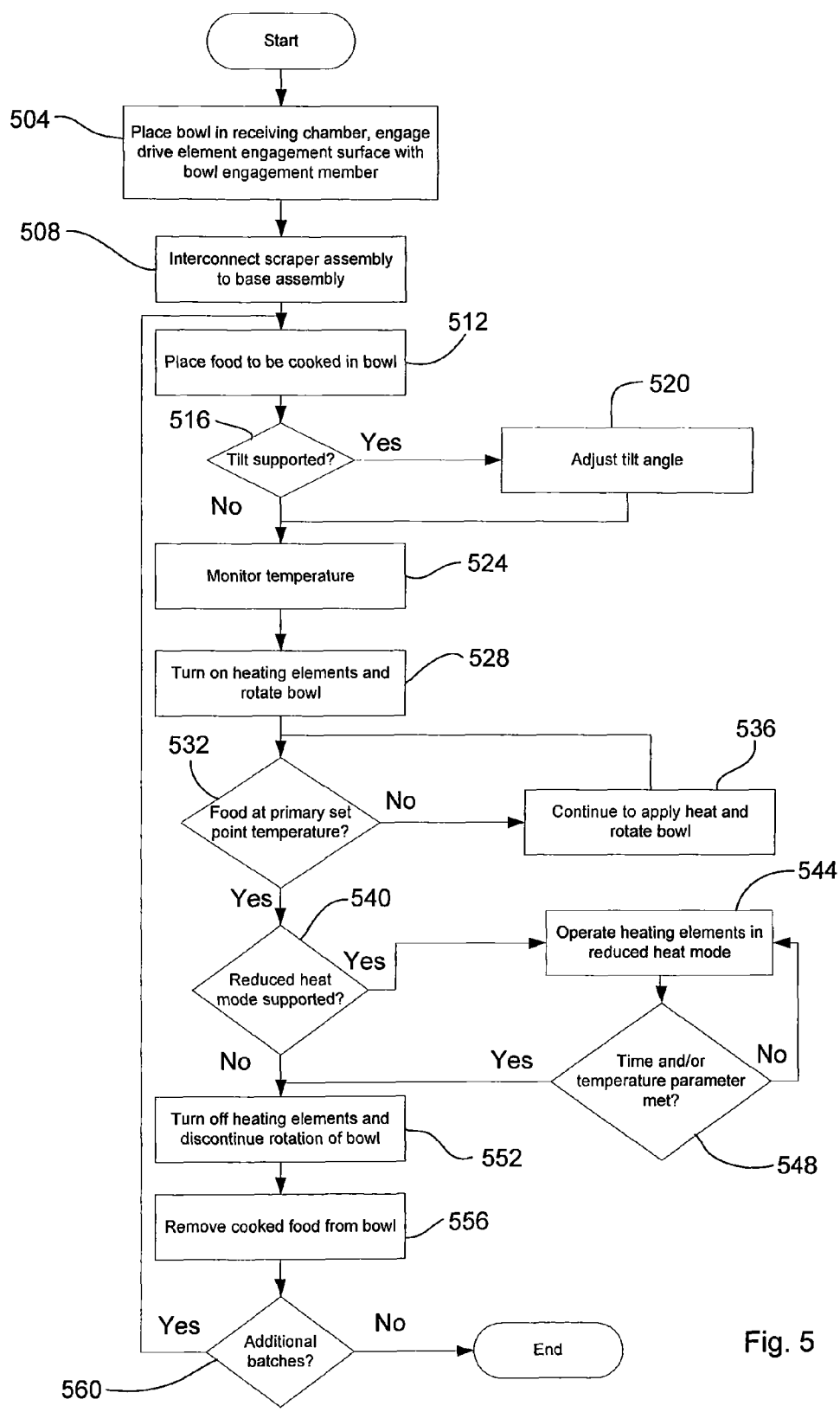
FIG. 5 illustrates aspects of a culinary method in accordance with embodiments of the present invention.

FIG. 5 illustrates aspects of a culinary method in accordance with embodiments of the present invention. Initially, at step 504, the bowl 108 is placed in the receiving chamber 204, through the receiving aperture 120, such that the drive element 280 engagement surface is mated with the drive engagement member of the bowl 272. The scraper assembly 112 is then interconnected to the base assembly 104 (step 508). Interconnecting the scraper assembly 112 to the base assembly 104 includes placing the scraper blade 148 inside the interior of the bowl 108, and interconnecting the bridge 136 of the scraper assembly 112 to the top surface 116 of the base assembly 104. In accordance with embodiments of the present invention, interconnecting the bridge 136 can include placing holes in the bridge 136 over pins or lugs provided by or fixed to the top surface 116 of the base assembly 104.

At step 512, food 292 to be cooked is placed in the bowl 108. At step 516, a determination may be made as to whether the cooking apparatus 100 features an adjustable tilt mechanism 240. If the cooking apparatus 100 includes an adjustable tilt mechanism 240, the tilt angle of the bowl 108 relative to horizontal is adjusted (step 520). Adjusting the tilt angle can include tilting the base member 228 until the food 292 held in the bowl 108 is within a desired distance from the top edge 268 of the bowl 108. As an example, the desired distance may be between one half inch to three inches from the top edge 268 of the bowl 108. By thus tilting the bowl 108, the food 292 is in contact with substantial portions of the side surface 260 of the bowl 108. Moreover, since the heating elements 212 are positioned adjacent the side surface 260, the heat applied to the bowl 108 is efficiently transferred to the food 292. This also results in the majority of the food 292 being held away from the center of the bowl's bottom surface 256, where the rotational velocity of the bowl 108 while the bowl is being rotated is zero, enhancing the folding and stirring action imparted to the food 292 by the rotation of the bowl 108 relative to the scraping assembly 112, as described herein. Adjustment of the tilt angle of the bowl 108 can be performed by a user operating a drive mechanism 252 comprising a hand crank or a drive motor. Alternatively, adjustment of the tilt angle of the bowl 108 can be in response to a signal from a tilt sensor 246 that is provided to the controller 296, which in turn provides a control signal to the drive mechanism 252. In particular, after the food 292 is placed in the bowl 108, the controller 296 can operate the drive mechanism 252 to tilt the bowl 108 away from horizontal (i.e., at a steeper and steeper angle), until the tilt sensor 246 sends a signal to the control indicating that the food 292 has extended to within a predetermined distance from the top edge 268 of the bowl. In response to the signal from the tilt sensor 246, the controller 296 stops operation of the drive mechanism 252. Alternatively, a preprogrammed tilt angle can be selected, depending on the volume of food 292 to be cooked. If the cooking apparatus 100 does not include an adjustable tilt mechanism 240, the bowl 240 is generally held at a fixed angle with respect to horizontal. The fixed angle and the interior volume of the bowl 108 are selected such that a predetermined amount of food 292 can be effectively cooked. In particular, the tilt angle and bowl 108 dimensions are selected such that a predetermined amount of food 292 will extend to within a desired distance from the top edge 268 of the bowl 108.

At step 524, the temperature of the food 296 and/or bowl 108 is monitored. This can include placing a food temperature sensor 132 in the food 296. In particular, for an immersion or contact type food temperature sensor, the food temperature sensor 132 is placed such that the tip of the probe is in the food 292 being cooked. For a non-contact infrared food temperature sensor 132, the food temperature sensor 132 is placed such that it has a line of sight to the food 292. Alternatively or in addition, a temperature signal may be obtained from a bowl side 294 and/or a bowl bottom 298 temperature sensor.

After placing the food 292 in the bowl 108 and adjusting the tilt of the bowl 108, if an adjustable tilt mechanism 240 is provided, the heating elements 212 and the drive motor 284 are activated (step 528). In accordance with embodiments of the present invention, the heating elements 212 provide radiant heat to the side surface 260 of the bowl 108, in turn heating the food 292 in the bowl 108. Operation of the drive motor 284 acts to rotate the bowl 108 within the receiving chamber 204. The rotation of the bowl 108 tends to lift the food 292 towards the blade 148. At the blade 148, the food 292 is moved away from the side surface 260, back towards the center of the bowl 108, creating a folding and/or stirring effect.

At step 532, a determination is made as to whether the food 292 is at a primary set point temperature. If it is determined that the food 292 is not at the primary set point temperature, heat continues to be applied by the heating elements 212, and the bowl 108 continues to be rotated by the drive motor 284 (step 536). If the food 292 has reached the primary set point temperature, a determination is made as to whether a reduced heat mode is supported (step 540). If a reduced heat mode is supported, the heating elements 212 can be operated in a reduced heat mode (step 544). In accordance with embodiments of the present invention, in a reduced heat mode, some of the heating elements 212 can be turned off, while other of the heating elements 212 continue to be operated at full power. In accordance with still other embodiments, some or all of the heating elements 212 can be operated in a pulsed mode, or at reduced power while in a reduced heat mode. A determination can then be made as to whether the food 292 has reached a selected time and/or temperature parameter (step 548). If the food has not reached the selected time or temperature parameter, the cooking apparatus 100 can continue to be operated in a reduced heat mode. If desired, additional set point temperatures can be established. Such additional set point temperatures can be used to further reduce the amount of applied heat, to increase heat if the temperature of the food 292 drops below a set point defining a lower temperature limit, and/or in connection with cooking or maintaining the food 292 at a desired temperature for a selected period of time.

After the food has reached the primary set point temperature and a determination is made that a reduced heat mode is not supported (at step 540), or after a desired temperature and/or time parameter has been met (at step 548), the heating elements 212 and the drive motor 284 are turned off (step 552). The food 292, now cooked, can then be removed from the bowl 108 (step 556). In accordance with embodiments of the present invention, this can include scooping the cooked food 292 out of the bowl 108 using a suitable implement. In accordance with other embodiments, removing the cooked food 292 can include disconnecting the scraper assembly 112 from the base assembly 104, removing the bowl 108 from the base assembly 104, and pouring and/or scraping the cooked food 292 out of the bowl 108. In accordance with still other embodiments, where a tilt mechanism 240 is provided, removing the cooked food 292 can include increasing the tilt angle and pouring the cooked food 292 from the bowl, with or without assistance from a suitable implement, into a receiving vessel.

At step 560, a determination may be made as to whether additional batches of cooked food 292 are desired. If additional batches are to be prepared, the process may return to step 412. If additional batches are not required, the process may end.

In accordance with further embodiments of the present invention, alternative or additional control parameters may be applied. For example, a time parameter may be applied, to discontinue operation of the heating elements 212 after a predetermined period of time. For example, if the predetermined period of time (e.g., 11 minutes) is reached, the heating elements 212 can be turned off to avoid overcooking. In addition, for example where both a bowl side temperature sensor 294 and a bowl bottom temperature sensor 298 are included, signals from both the sensors 294, 298 can be provided to the controller 296, and those signals used to modulate the heat produced by the heating elements 212. For example, where a temperature of 300° F. is reached at the bowl side temperature sensor 294, the heat produced by the heating elements 212 can be reduced. Reducing the heat produced by the heating elements 212 can be performed in steps. For example, some or all of the heating elements 212 can be operated at levels of 100%, 75%, 50%, or 25%. Such control may be implemented by reducing the amount of power provided to individual heating elements 212, or sets of heating elements 212. For example, the heating elements 212 may be controlled as two sets of four heaters. As another example, a set of four heating elements 212 around a top half of the receiving chamber 204 can be turned off after a predetermined temperature, as sensed by a temperature sensor 280, 294 and/or 298 has been reached, while continuing to operate heating elements 212 arranged around the bottom half of the receiving chamber 204, when the receiving chamber 204 is tilted. As yet another example, when the temperature sensed by the bottom temperature sensor 298 reaches 161° F., an alarm can be generated to alert a user that the food 292 will soon be cooked. In accordance with still other embodiments, different programs may be implemented by the controller 296 that apply different temperature and/or time parameters for cooking different foods 292.

As described herein, the bowl 108 is rotated while in an orientation that is tilted with respect to horizontal, in order to maintain a substantial portion of the food 292 along the side 260 of the bowl 108. Exemplary angles from horizontal while the bowl 108 is being rotated and heated range from 10 to 80 degrees. However, as can be appreciated by one of skill in the art after consideration of the present disclosure, the exact angle from horizontal, and an operational range of angles, is dependent on the geometry and size of the bowl 108, and the amount of food 292 being cooked. In accordance with still other embodiments, a tilt mechanism 240 can be provided that, in addition to accommodating tilt angles used during cooking of the food 292, can accommodate angles used for loading and/or unloading. In particular, an angle of 0 degrees can be useful for placing the bowl 108 in the receiving chamber 204. As another example, an angle of greater than 90 degrees, for example an angle of up to 140 degrees, can be useful to remove food 292 from the bowl 108.

In accordance with embodiments of the present invention, the controller 296 can be programmed to perform or control various functions of the cooking apparatus 100. For example, the controller 296 can control the amount of heat output by heating elements 212, in response to temperature information provided by the food temperature sensor 132. Moreover, in response to such temperature information, and/or to timer information maintained by the controller 296 or a separate device, rotation of the bowl 108 through operation of the drive motor 284 can be controlled. Moreover, the controller 296 can control operation of a provided tilt mechanism 240. For example, the tilt angle of the bowl 108 can be controlled by operating the tilt mechanism 240 drive mechanism 252 in response to a signal from the tilt sensor 246. The controller 296 can also receive control information provided by a user through the control interface 128. For example, the control interface 128 can provide various buttons or other inputs for controlling operational parameters of the cooking apparatus 100, such as the application of heat through the heating elements 212, the rotation of the bowl 108 by the drive motor 284, and the tilt of the bowl 108 by the tilt mechanism 240. Control input can also be provided with respect to primary and/or reduced heat temperatures at which the food 292 is maintained, the time of cooking, and other parameters, either entered directly, or entered as selectable cooking modes, for example for different recipes.

In accordance with embodiments of the present invention, the speed at which the bowl 108 rotates and/or the temperature at which the food 292 being cooked is maintained is varied according to menu driven cooking plans implemented by or in connection with the controller 296. Moreover, the speed and temperature can be controlled in response to various inputs, including signals from the temperature sensors 294, 298 and from watchdog timers. In accordance with further embodiments of the present invention, the cooking plans are preprogrammed and selected by the operator from the stored menu.

In accordance with still other embodiments, the bowl 108 can be modified for cooking food other than sauces or other liquids. For example, the interior of the bowl 108 can be provided with baffles or bats running down the side surface for roasting seeds, spices, rice, or for stir frying foods. Where baffles are included, the scraper assembly 112 can be modified or omitted.

In an exemplary embodiment, a cooking apparatus 100 can be used to produce European cream eggs. In European cream eggs, a mixture of beaten eggs is cooked until the portions of the egg mixture comprising the egg whites has solidified, while the portions comprising the egg yolks remain fluid. In particular, the precise application of heat, and the constant stirring motion imparted by the rotation of the bowl 108 relative to the scraper assembly 112 can facilitate the consistent preparation of European cream eggs, even by relatively unskilled personnel.

In accordance with other exemplary embodiments, the cooking assembly 100 can be usefully applied to cooking egg-based sauces, such as hollandaise sauce, custards, and puddings. In general, such egg-based dishes have been difficult to reliably produce, particularly in large quantities, and have required constant attention. The precise heat control and constant stirring provided by the cooking apparatus 100 in accordance with embodiments of the present invention allow such egg-based mixtures to be produced reliably and in large quantities.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A cooking apparatus, comprising:
 a base assembly, including:
  a top surface;
  an aperture in the top surface having a first diameter; and
  a circular side wall having a second diameter defining a receiving chamber, wherein the receiving chamber is open at the aperture in the top surface;
 a plurality of heating elements, wherein the plurality of heating elements are located at intervals along the circular side wall;
 a bowl placed within the receiving chamber, the bowl including:
  a side surface;
  a bottom surface; and
  a drive engagement member;
 a tilt sensor, wherein the tilt sensor is operable to detect a desired distance from a top edge of the bowl to material to be cooked placed within the bowl;
 a drive motor;
 a scraper assembly, including:
  a bridge member interconnected to the top surface; and
  a scraper blade interconnected to the bridge member, wherein an edge of the scraper blade is in contact with at least the side surface of the bowl; and
 a drive element, wherein the drive element is interconnected to the drive motor, wherein the drive element includes an engagement surface that extends into the receiving chamber, wherein the drive element is centered within the receiving chamber, wherein the drive element rotates about an axis that is at an angle from horizontal of from 0 to 140 degrees, and wherein the drive engagement member engages the engagement surface of the drive element when the bowl is placed in the receiving chamber.

2. The cooking apparatus of claim 1, further comprising:
 a plurality of support elements, wherein at least one support element is in contact with the side surface of the bowl when the bowl is placed in the receiving chamber.

3. The cooking apparatus of claim 1, further comprising:
 a temperature sensor; and
 a controller, wherein the controller is operatively connected to the plurality of heating elements, the drive motor, and the temperature sensor.

4. The cooking apparatus of claim 3, wherein the controller is operable to discontinue a drive signal to the drive motor in response to a signal from the temperature sensor indicating that a first predetermined temperature has been reached.

5. The cooking apparatus of claim 3, wherein the controller is operable to vary an operating signal provided to at least some of the heating elements in response to a signal from the temperature sensor that the first predetermined temperature has been reached.

6. The cooking apparatus of claim 1, further comprising a tilt mechanism, wherein at least the angle about which the drive mechanism rotates and the angle of the receiving chamber can be selected by adjusting the tilt mechanism.

7. The cooking apparatus of claim 1, further comprising:
 a tilt mechanism, including:

a tilt mechanism motor, wherein the tilt mechanism is driven by the tilt mechanism motor to place at least the receiving chamber at a selected angle from horizontal;

wherein the tilt sensor provides a signal used in connection with operation of the tilt mechanism motor and the selected angle from horizontal of the receiving chamber.

8. The cooking apparatus of claim 1, further comprising:

insulation associated with the circular side wall of the base assembly.

9. A cooking apparatus, comprising:

a bowl, including:
- a bottom surface;
- a top edge;
- a side extending between the bottom surface and the top edge, the side including an exterior side and having a first maximum diameter;
- a drive engagement member;

a base assembly, including:
- a top surface with a receiving aperture having a second diameter, wherein the second diameter is larger than the first maximum diameter;
- a receiving chamber;
- a drive motor;
- a drive element interconnected to and rotated by the drive motor;
- a plurality of heating elements, wherein the plurality of heating elements are located at intervals about a third diameter that is concentric with the second diameter of the receiving aperture;
- at least a first support surface, wherein the bowl is received by the receiving chamber, wherein the drive engagement member is mated to the drive element, wherein the at least a first support surface is in contact with at least a portion of an exterior side of the side of the bowl, and wherein the bowl is held at an angle of from horizontal when the bowl is received by the receiving chamber;

a tilt sensor, wherein the tilt sensor is operable to detect a desired distance from a top edge of the bowl to material to be cooked placed within the bowl;

a scraper assembly, including:
- a bridge interconnected to the top surface; and
- a scraper blade interconnected to the bridge, wherein at least a portion of the scraper blade is in contact with the side of the bowl.

10. The apparatus of claim 9, further comprising:

a tilt mechanism, wherein the angle $\alpha$ from horizontal of the bowl while the bowl is received by the receiving chamber is controlled by the tilt mechanism.

* * * * *